United States Patent
Arimatsu et al.

(10) Patent No.: US 8,295,975 B2
(45) Date of Patent: Oct. 23, 2012

(54) OBJECT PICKING DEVICE

(75) Inventors: Taro Arimatsu, Yamanashi (JP); Kazunori Ban, Yamanashi (JP); Ichiro Kanno, Yamanashi (JP); Keisuke Watanabe, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 350 days.

(21) Appl. No.: 12/475,622

(22) Filed: Jun. 1, 2009

(65) Prior Publication Data

US 2010/0004778 A1 Jan. 7, 2010

(30) Foreign Application Priority Data

Jul. 4, 2008 (JP) ................. 2008-175508

(51) Int. Cl.
*G06F 7/00* (2006.01)
(52) U.S. Cl. ........... 700/216; 700/245
(58) Field of Classification Search ........... 700/216, 700/245, 257; 345/103
See application file for complete search history.

(56) References Cited

U.S. PATENT DOCUMENTS

| | | | | |
|---|---|---|---|---|
| 6,970,769 B2* | 11/2005 | Rice et al. | | 700/216 |
| 7,313,464 B1* | 12/2007 | Perreault et al. | | 700/245 |
| 7,430,838 B2* | 10/2008 | Rice et al. | | 53/55 |
| 2004/0019405 A1 | 1/2004 | Ban et al. | | |
| 2004/0117066 A1* | 6/2004 | Ban et al. | | 700/245 |
| 2004/0122552 A1 | 6/2004 | Ban et al. | | |
| 2004/0162639 A1* | 8/2004 | Watanabe et al. | | 700/259 |
| 2006/0184282 A1* | 8/2006 | Strasser et al. | | 700/258 |
| 2007/0177790 A1 | 8/2007 | Ban et al. | | |
| 2010/0106297 A1* | 4/2010 | Inazumi et al. | | 700/245 |

FOREIGN PATENT DOCUMENTS

| | | |
|---|---|---|
| EP | 1 462 997 | 9/2004 |
| GB | 2 248 317 | 1/1992 |
| JP | 61-76291 | 4/1986 |
| JP | 63-174890 | 7/1988 |
| JP | 1078103 | 3/1989 |
| JP | 2-256485 | 10/1990 |
| JP | 4093191 | 3/1992 |
| JP | 2000061875 | 2/2000 |
| JP | 2002068472 | 3/2002 |
| JP | 2004-188562 | 7/2004 |
| JP | 2007203406 | 8/2007 |

OTHER PUBLICATIONS

German Office Action dated Nov. 10, 2010 issued in German Application No. 10 2009 030 461.4 (including an English-language translation thereof). Japanese Notice of Reasons for Rejection mailed Apr. 13, 2010issued in Japanese Application No. 2008-175508 (including a partial translation thereof).
Roger Y. Tsai, "An Efficient and Accurate Camera Calibration Technique for 3D Machine Vision," in Proc. IEEE CVPR, Jun. 1986, pp. 364-374.

* cited by examiner

*Primary Examiner* — Ramya Burgess
(74) *Attorney, Agent, or Firm* — Drinker Biddle & Reath LLP (57) ABSTRACT

An object picking device, which is inexpensive and capable of speedily and accurately picking one object at a time from a random pile state. A target detecting part of an image processing part processes an image captured by a camera and detects objects. A target selecting part selects an object among the detected objects based on a certain rule. A view line direction calculating part calculates the direction of a view line extending to the selected object. A target position estimating part estimates the position including the height of the selected object based on size information of the object in the image. Then, a grip correction calculating part calculates an amount of correction of the movement of a robot so as to grip the object by using the robot.

7 Claims, 5 Drawing Sheets

OBJECT PICKING DEVICE

RELATED APPLICATIONS

The present application claims priority from Japanese Patent Application No. 2008-175508, filed on Jul. 4, 2008, the entire contents of which are fully incorporated herein by reference.

BACKGROUND OF THE INVENTION

1. Field of the Invention

The present invention relates to a picking device for sequentially picking a plurality of objects which are randomly piled.

2. Description of the Related Art

For example, in a manufacturing process for an automobile component, the processes of die-casting, machining and assembling of component materials are individually carried out, and each process is carried out in different cycle time. Since each process is carried out at a different area of a product line, the components are often required to be transferred between each process. Therefore, after one process is finished, the processed components are collectively stored in a container or a basket, until the components are supplied to the next process. In particular, since it is usually not a problem for the component materials to have to have a few scratches prior to the machining process, the components are often stored in a "random pile" state.

There are mainly three methods for picking objects such as the above mentioned component materials contained in a "random pile" state in a basket or the like. The first method is to pick and align each object by hand before supplying the object to the next process, or to pick each object and set on a machine tool or the like by hand. However, since this method tends to increase the workload of an operator, the following methods have been used in recent years.

The second method is to attach a magnet to a picking hand such as a robot hand, and to pick each object by putting the hand into a basket containing the object. In this method, a robot is moved randomly or with a certain level of regularity within the basket so as to pick each object. Therefore, the robot hand may be positioned at a region in the basket where the objects do not exist, may unstably grip the object and then drop it or may pick two or more objects at the same time, whereby the reliability and efficiency of the operation is deteriorated.

The third method is to use a vision sensor to assist the picking operation by a robot. Since this method improves reliability of the operation for sequentially picking each object, it has been employed in many cases. For example, Japanese Patent Publication (Kokai) No. 2004-188562 discloses a workpiece picking device having a three-dimensional vision sensor mounted to a robot, in which the vision sensor measures the position and orientation of a specified object among a plurality kinds of object and the robot picks the specified object.

Japanese Patent Publication (Kokai) No. 2-256485 discloses a robot having a vision unit, in which a robot hand picks an object contained in a box.

The device of Japanese Patent Publication (Kokai) No. 2004-188562 is suitable for sequentially picking a plurality of objects which are stacked in a "random pile" state. However, the method disclosed takes a time to pick each object, because first the device requires the height distribution data of the region of interest, then the target objects need to be detected from the captured two-dimensional image, and finally the robot must be moved to align the three-dimensional vision sensor with the target object for obtaining the position and the orientation of the object where yet another detection is made, all before the robot can position itself for gripping one object.

Figure 8:
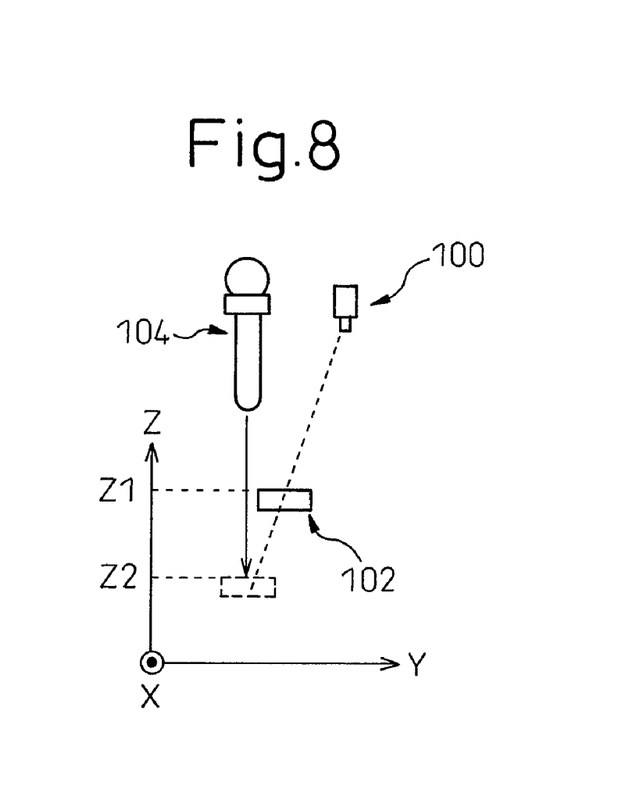
FIG. 8 schematically shows the positional relationship between a camera, a robot hand and an object in the prior art.

On the other hand, in the device of Japanese Patent Publication (Kokai) No. 2-256485, objects can be picked if a plurality of objects are stacked in a laminar manner and the existing heights of the stacked objects are known. However, when the position and the orientation of the objects are not in order such as in the case of a "random pile" state, the failure of picking may occur, e.g., the gripping position of a robot may be offset and/or a hand of the robot may interfere with another object. For example, as shown in FIG. 8, a robot hand 104 is intended to pick an object 102 from directly above the object, while object 102 is positioned on a view line of a camera 100. At this point, in the case where object 102 is located at position Z2 even though the object is expected to be located at a predetermined position Z1 in relation to the Z-direction, at least one of the X- and Y-coordinates of the gripping position for object 102 is different from the actual coordinates. As such, when an object is to be picked from a "random pile" state in which the existing height of each object is unknown, the picking operation cannot be properly carried out without accurately obtaining the X-, Y- and Z-coordinates of the object to be picked.

SUMMARY OF THE INVENTION

Accordingly, the purpose of the present invention is to provide an object picking device, which is inexpensive and capable of speedily and accurately picking an object from a random pile state.

According to the present invention, there is provided an object picking device, comprising: a camera adapted to capture a two-dimensional image including an image of a plurality of the same kind of objects that are randomly piled; a robot adapted to pick the objects one-by-one from the plurality of objects; an image processing part which processes the image captured by the camera; and a handling controlling part which controls the robot, wherein the image processing part comprises: a target detecting part which detects information of the two-dimensional position and the size of each objects in the image of the plurality of objects; a data storing part which stores height information regarding the height of the existing position of an object at a reference position, the height information being associated with size information of the object in the captured image at the reference position, the data storing part also storing data regarding a feature model of the object; a target selecting part which selects an object as a target to be picked, the object having the highest degree of priority which is calculated by using at least one of size information of an image of each detected object, a degree of coincidence between the image of the detected object and the feature model, and a degree of inclination of the image of the detected object in relation to the feature model; a view line direction calculating part which calculates the direction of a view line of the camera in the three-dimensional field between the camera and the selected object, based on the information of the two-dimensional position of the selected object; a target position estimating part which calculates the existing height of the selected object based on the size information of the selected object and the information of the exiting position and the size of the object at the reference position stored in the data storing part, the target position estimating part further calculating the three-dimensional position of the selected object based on the existing height of the selected object and the direction of the view line; and a grip correction calculating part which calculates an amount of correction of the movement of the robot, the amount of correction being adapted to grip the selected object by using the robot, wherein the handling controlling part comprising: a movement controlling part which controls the movement of the robot, so as to move a robot hand to the three-dimensional position of the selected object, along the direction of the view line of the camera in relation to the selected object; a contact sensing part which detects that the robot hand has come in contact with the selected object; a grip commanding part which commands the robot hand to stop the movement thereof and grip the selected object with the robot hand when the contact sensing part detects the contact between the robot hand and the selected object; and a pull-out commanding part which commands the robot to pull out the object gripped by the robot hand.

A preferred example of the degree of priority is a product sum value obtained by calculating a summation of at least two of the size information, the degree of coincidence and the degree of inclination of each of the plurality of objects after multiplying a certain coefficient to by each of the size information, the degree of coincidence and the degree of inclination.

Another preferred example of the degree of priority is a product value of at least two of the size information, the degree of coincidence and the degree of inclination of each of the plurality of objects.

The robot hand may have a base part, a front end part configured to grip the selected object, and a compliance mechanism which connects the front end part to the base part so that the orientation of the front end part may be varied corresponding to the orientation of the selected object.

In a preferred embodiment, wherein the front end part has an electromagnet having generally a hemispherical shape adapted to engage a hole or a recess formed in the selected object.

In another preferred embodiment, the front end part has a suction cup which generates vacuum adsorption force by which the suction cup may adsorbingly grip the selected object.

In still another preferred embodiment, the front end part has a chuck mechanism configured to grip the selected object.

BRIEF DESCRIPTION OF THE DRAWINGS

The above and other objects, features and advantages of the present invention will be made more apparent by the following description, of the preferred embodiments thereof, with reference to the accompanying drawings wherein.

DETAILED DESCRIPTIONS

Figure 1:
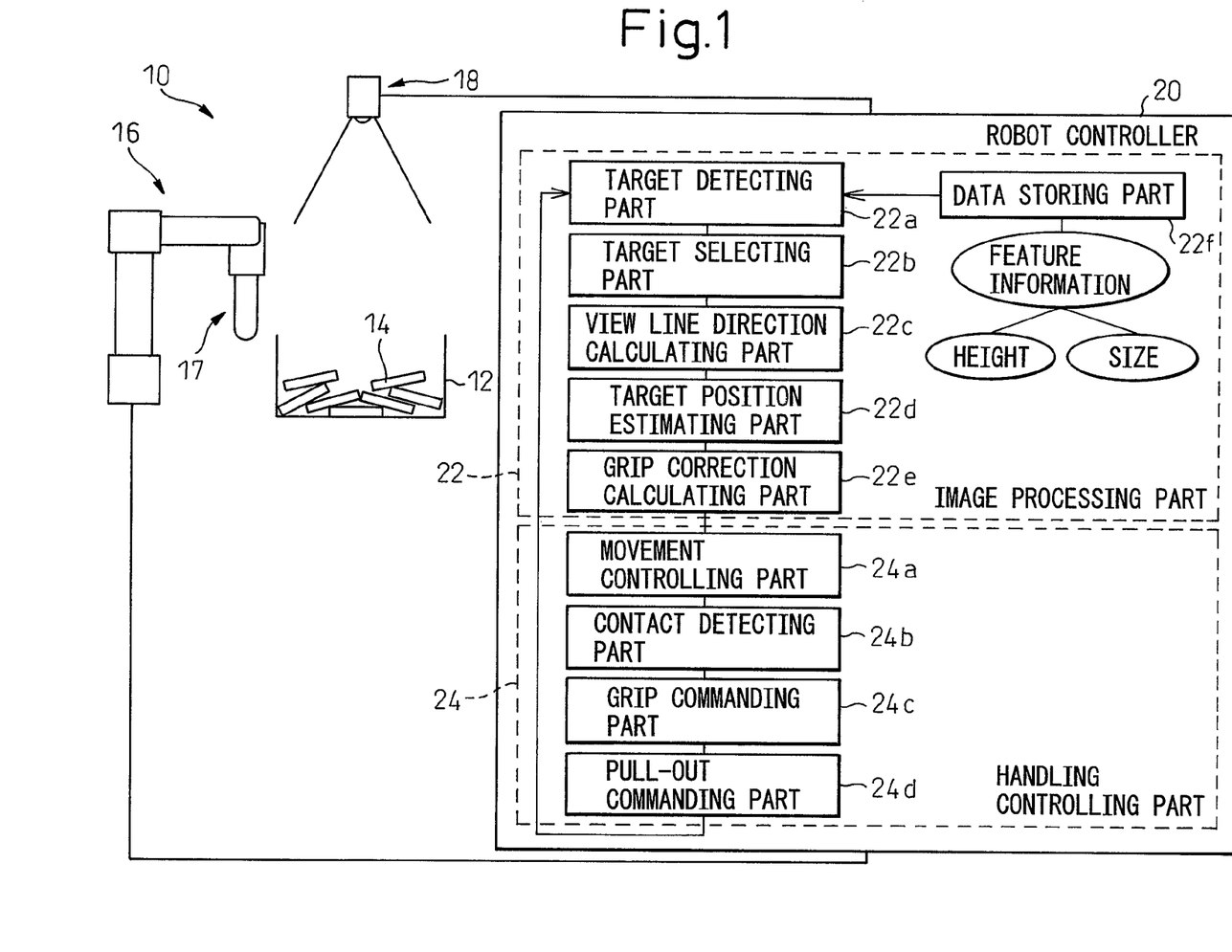
FIG. 1 shows a schematic configuration of an object picking device according to the invention.

FIG. 1 shows a total configuration of an object picking device 10 according to a preferred embodiment of the invention. Picking device 10 has a robot 16 configured to grip and pick each object among a plurality of the same kind of articles or objects 14 contained in an object container 12, an imaging part or a video camera 18, positioned generally directly above container 12, which captures objects 14 over a wide range (for example, the entirety of container 12 is captured within a field of view of camera 18), and a robot controller 20 which controls robot 16 and processes an image obtained by video camera 18. The term "grip" as used herein means a gripping operation of the object by a robot hand or the like, as well as an adsorbing operation of the object by an electromagnet or a vacuum suction cup as described below. The latter operation may be referred to as "adsorption grip".

Robot controller 20 processes a two-dimensional image inputted from camera 18. In a block diagram of FIG. 1 showing the function of robot controller 20, a section 22 indicated by a dot-line corresponds to an image processing part for carrying out image processing. The image processing may be carried out by another image processor and the result obtained by the image processor may be fed to robot controller 20 via a suitable communicating means.

Robot 16 is positioned at a place where robot 16 may sequentially grip and pick object 14 from container 12. Video camera 18, which serves as an image capturing device for capturing an image of the contents over a wide range, is positioned generally directly above container 12 so that container 12 is included in a field of view of camera 18. Furthermore, by positioning video camera 18 close to container 12 with enough clearance from the picking operation of the robot, the optical resolution of the camera along the optical axis thereof may be improved. In other words, the difference of the actual existing height of each object 14 within container 12 may be clearly indicated as the difference of the size of each object in an image obtained by video camera 18. Due to this, based on the size of object 14 in the image, the actual exiting height of the object may be accurately estimated. Further, when the camera is positioned generally directly above the center of container 12, a view line of the camera is away form a wall of the container, whereby the robot (or the robot hand) is unlikely to interfere with the wall during the approach motion as described below. Otherwise, the camera may be attached to robot 16 near the robot hand mounted at the front end of the robot, so that the camera may be moved by the motion of robot 16, by which the camera may capture an image after the camera is positioned above container 12.

A target detecting part 22a of image processing part 22 of robot controller 20 processes an image captured by video camera 18 and detects a plurality of objects. A target selecting part 22b selects an object as a target to be picked among the plurality of objects, according to the procedure as described below. The procedure based on size information of the image of the detected object, a degree of coincidence (or a degree of matching) between the image of the detected object and the feature model, a degree of inclination of the image of the detected object in relation to the feature model, presence or absence of hiding or overlapping of the object by another object, or the combination of at least two of them. For example, as the simplest case, the highest degree of priority of picking is given to the object having the largest detected size, whereby the object positioned at the top layer within the container is picked first. Or, the object having the higher degree of matching compared to the feature model may be judged to be more correctly detected. Further, by taking both the detected size and the degree of matching into consideration, the object, which is positioned at the highest level and correctly detected, is preferentially or firstly picked. Then, as described below, a view line direction calculating part 22c calculates the direction of a view line of the camera toward the selected object, and a target height estimating part 22d estimates the position and the height of the selected object based on the size information of the image of the object. Next, a grip correction calculating part 22e calculates an amount of correction of movement which is required for the robot so as to grip the object. A data storing part 22f may store a teaching model and/or data regarding a feature model for calculating the degree of matching and/or the degree of inclination.

Figure 2:
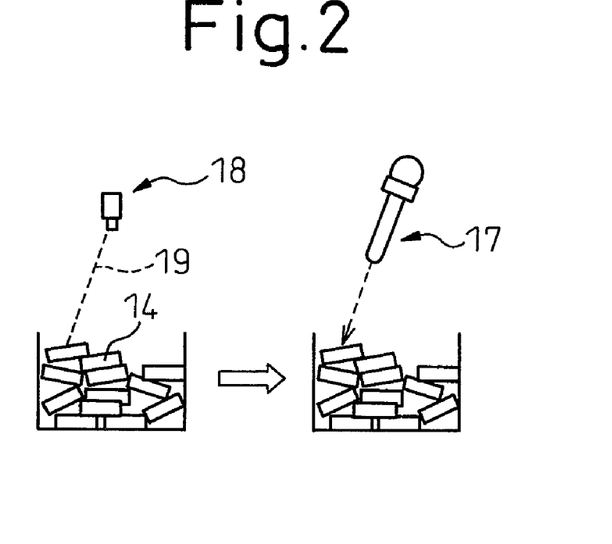
FIG. 2 schematically shows a view line of a camera and an approach path of a robot hand.

Next, a handling controlling part 24 utilizes the result of the process of image processing part 22, and then carries out handling motion (or a series of motions including approaching to the object, gripping and picking the object) by using the robot. As shown in FIG. 2, the path of approach of the robot hand is determined by calculating as a view line 19 from video camera 18 to the target object and aligning the direction of operation (or movement) of robot hand 17 with the view line. When the robot approaches the gripping position, a movement controlling part 24a generates a speed command of the robot hand approaching the calculated gripping position, and controls the approach of the robot hand while activating a contact sensing part 24b. Immediately after contact sensing part 24b senses the contact between the robot hand and the object, a grip commanding part 24c stops the robot and commands the robot to grip the object. When it is confirmed that the object is gripped, a pull-out commanding part 24d commands the robot to pull-out the gripped object and convey the object to a predetermined place. It is preferable that this pull-out motion is performed along the approach path described above, and in the direction opposite to the approaching direction. By repeating the series of motions, the objects within the container are sequentially picked or extracted. In addition, when the robot hand is moved toward an object detected in the image along the view line extending to the object, it is preferable that the robot hand is moved at a high speed until the robot hand reaches a certain height (for example, the height higher than the exiting height of the target object by a constant value), and is moved at a relatively low speed after that.

Figure 3:
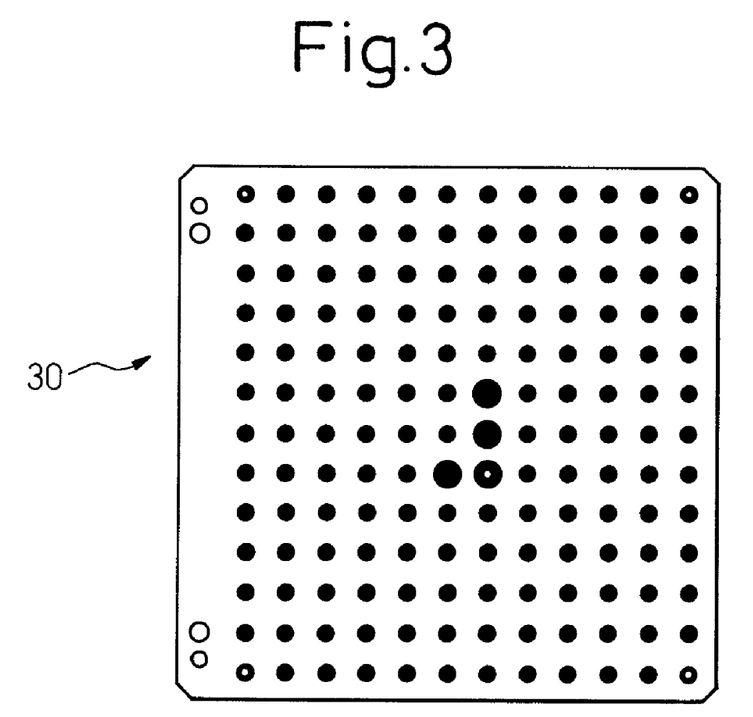
FIG. 3 shows an example of a dot pattern plate.

In order to calculate a view line extending from (the optical center of) the camera to an object detected by the camera, internal parameters of an optical system of the camera and external parameters representing a task coordinate system defined as a task space for the camera and the robot need to be predetermined. A method for calibrating the camera so as to calculate these parameters is known, and thus the explanation thereof is omitted. One example of the method is "An Efficient and Accurate Camera Calibration Technique for 3D Machine Vision" (CVPR, pp. 364-374, 1986 IEEE) by Roger Y. Tsai. As an example of concrete means for the calibration, as shown in FIG. 3, a dot pattern plate 30 on which a plurality of dots are formed in a known geometrical alignment may be used. The camera may be calibrated by carrying out measurement at known two positions while dot pattern plate 30 is arranged perpendicular to an optical axis of the camera.

Hereinafter, the detail of image processing is explained. First, in order to detect an object to be picked from the obtained image, a model of a reference object for the detection is taught. A preferable taught model is determined by extracting a feature (for example, the shape and the length) of an edge portion of an object where the brightness of a picture cell in the image is significantly changed. Since the orientation of each object is different in "random pile," the success rate of detection of the object may be improved by teaching a plurality of models regarding various orientations of the object.

Among the detected objects, one object which satisfies a predetermined condition is selected. At this point, by using a detected score (or the degree of coincidence), the size in the detected image, the degree of inclination or the integration value thereof, the possibility of failure in picking may be reduced. The detected score indicates the degree of coincidence between the taught model and the detected image. For example, if the detected image is completely coincident with the taught model, the score is 100%. Otherwise, the score is reduced corresponding to the ratio of a picture cell in which the detected image and the taught model is different. The size of the detected object to be used is the size when the size of the taught model is 100%. The degree of inclination of the detected object to be used is cosine (%) of angle of inclination when the angle of inclination of the taught model is 0 degree. In other words, if the angle of inclination of the detected object is 0 degree, the degree of inclination of the object is 100%. As the angle of inclination of the object increases, the value of the degree of inclination decreases. Among the above values, some of the values, which may be effective for calculating the degree of priority of picking the object, are selected and multiplied each other to obtain the degree of priority. By sequentially picking the object in descending order of the degree of priority, the efficient picking operation may be carried out.

It is also effective to determine the degree of priority by calculating a product sum, i.e., a summation of each criterion value after multiplying a certain coefficient to each criterion value. Concretely, when the coefficients for the score, the size and the degree of inclination as described above are set to 0.5, 0.25 and 0.25, respectively, and when the score, the size and the degree of inclination of a certain detected object are 96%, 100% and 95%, the product sum or the degree of priority of the object is 96.75. Further, when the score, the size and the degree of inclination of another detected object are 90%, 110% and 95%, the product sum of the object is 96.25. Therefore, the degree of priority of the former object is larger than the degree of priority of the latter object, and thus the former object will be picked prior to the latter object. As such, by multiplying the coefficient to each parameter (in this case, the highest coefficient is multiplied to the score), the optimum degree of priority may be calculated corresponding to application of the device.

On the other hand, regarding the above two objects, when the degree of priority is determined as a product value of each parameter, the degrees of priority of the former and latter objects are 91.2 and 94.05, respectively. Since the score of the latter objects is relatively low (90%), it can be understood that the latter object is not correctly detected or is partially hidden by other objects. However, since the size of the latter object is relatively high (110%), it can be understood that the height of the position of the latter object within the container is relatively high, and thus the degree of the priority becomes relatively high. In other words, the product value of multiple parameters is suitable in the cases where the degree of priority should not depend solely on a single parameter to which a large coefficient is multiplied.

In the above example, the product value or the product sum of the three parameters is used. However, a product value or a product sum of two of the three parameters may also be used, and/or another parameter may be alternatively or additionally used. Further, only one parameter may be used as the degree of priority.

In order to estimate the existing height of the object, the size information of the object in the obtained image is used. This estimation is based on the detected size of a reference object at two predetermined different height positions. Otherwise, the estimation may be based on the detected size of one object at a predetermined reference position or height and the distance in the height direction between the video camera and the object. The height information and the size information of the object (hereinafter, referred to as reference data) are stored, as a part of the feature information of the model, in a memory such as data storing part 22f of controller 20.

Hereinafter, with reference to FIG. 4, a method for estimating the existing height of the object captured in the image, by using the reference data obtained by detecting the object at the two different height positions, is explained. First, when the reference data is obtained (as shown in the left side of FIG. 4), regarding an object positioned at a height position Z1 in a certain coordinate system, the detected size of the object in the image is set to a size S1. Similarly, regarding an object positioned at a height position Z2, the detected size of the object in the image is set to a size S2. At this point, since the detected size or the object in the image is inversely proportional to the distance between the camera and the object, the following equation (1) is true.

$$S2/S1=D1/D2=(Z0-Z1)/(Z0-Z2) \quad (1)$$

where D1 represents the distance between the camera and the object at Z1, and D2 represents the distance between the camera and the object at Z2.

In equation (1), the existing height of the camera Z0 is calculated by the following equation (2).

$$Z0=(S2\cdot Z2-S1\cdot Z1)/(S2-S1) \quad (2)$$

Figure 4:
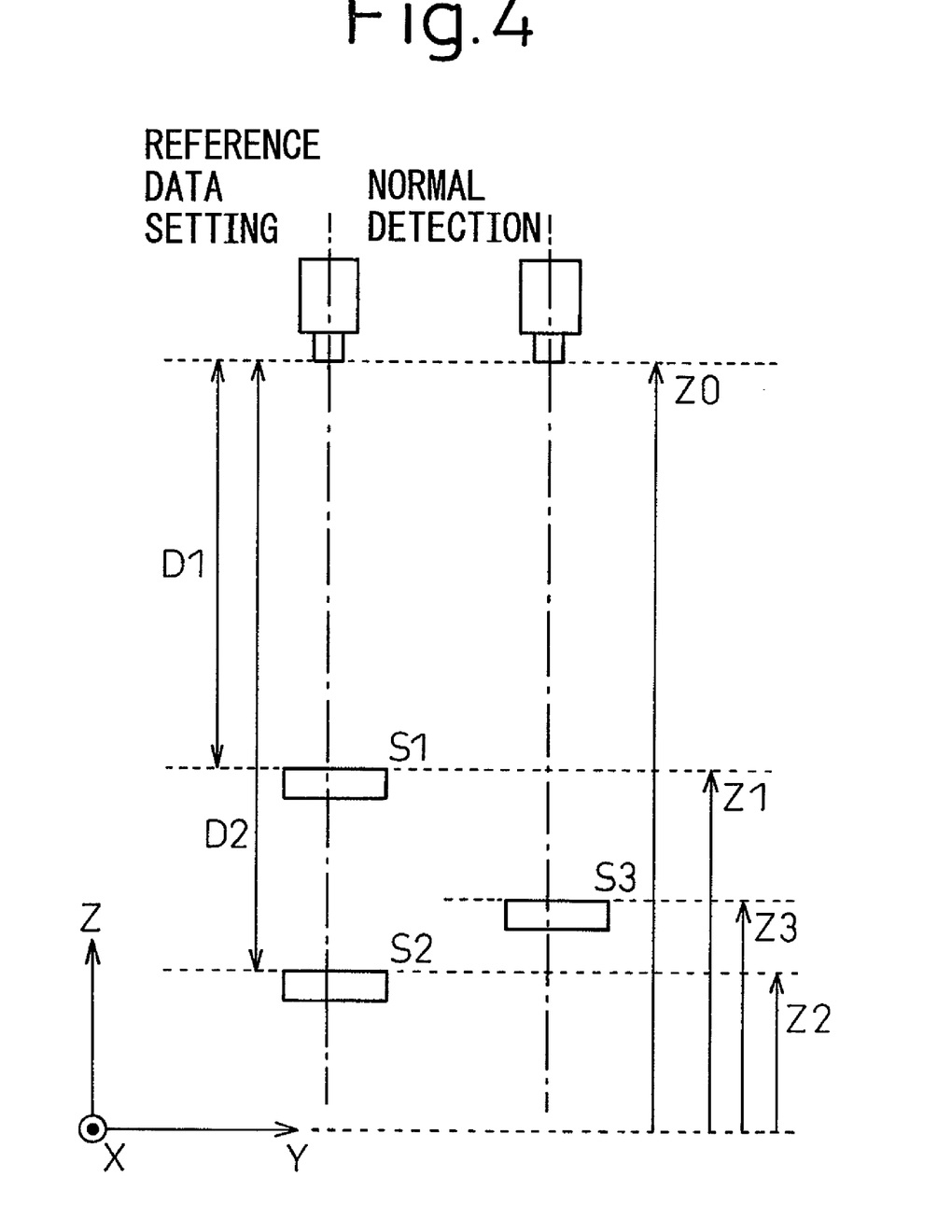
FIG. 4 is a view explaining a calculation method of the existing height of an object.

Next, as shown in the right side of FIG. 4, in a normal detection which is carried out at timing different from the reference data detection, the detected size of the object in the image is set to S3. The height of the object is calculated by the following equation (3).

$$Z3=(S1/S3)\cdot(Z1-Z0)+Z0 \quad (3)$$

From equation (3), the existing height of the object at an arbitrary position may be estimated, by predetermining the detected size of the object at the reference position (S1), the existing height thereof (Z1), and the distance between the object at the reference position and the video camera (D1=Z0−Z1).

The estimation of the height of the object may also be carried out by using a stereo camera or a three-dimensional measurement using structured light. However, such a method is disadvantageous in terms of the cost of hardware and measurement time.

In the robot controller, information regarding a view line of the camera toward a reference object and the motion of the robot for gripping the object is previously set as teaching data. In the actual picking operation, the difference, between information of a view line toward a reference object and information of a view line toward an object to be gripped, is calculated, and then an amount of correction for the motion of the robot can be calculated based on the difference, so as to grip the object by using the robot.

The terminal of the approach path of the robot is set to a position, the height of which is lower than the estimated or calculated existing height of the selected object by a certain length. This is intended to avoid that the robot cannot reach the selected object when the estimated existing height of the selected object includes an error. However, in this case, when the estimated existing height is correct or the position of the actual object is higher than the estimated existing height, the robot hand may inadvertently interfere with the selected object, and the robot hand may be damaged in some cases. In order to avoid such an unfavorable interference, the robot may be provided with a sensor for detecting the contact between the robot hand and the object. The movement of the robot is stopped when a signal of the sensor is detected, and then the robot performs the picking operation. As the sensor, depending on the constitution of the robot hand, an adsorption sensor, a limit switch, a proximity switch, an auto switch or the like may be used. Further, the contact between the robot hand and the object may also be detected by continuously monitoring a load applied to a motor of the robot. The pull-out motion of the robot is preferably carried out in the direction opposite to the approaching direction, whereby interfere between the robot and another object may be avoided. However, the pull-out motion is not limited to such a motion. For example, in some cases, there is no problem if the gripped object is raised up vertically.

Figure 5:
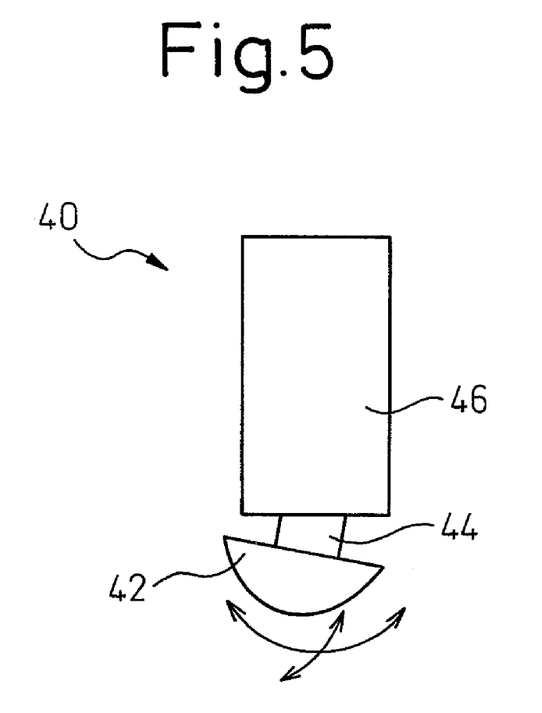
FIG. 5 shows a preferred embodiment of the robot hand.
Figure 6:
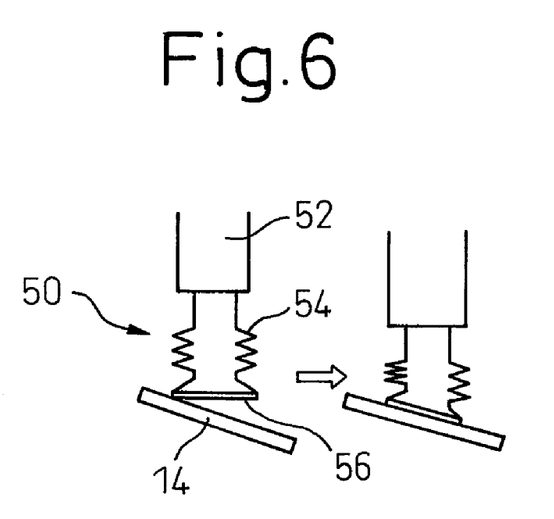
FIG. 6 shows another preferred embodiment of the robot hand.
Figure 7:
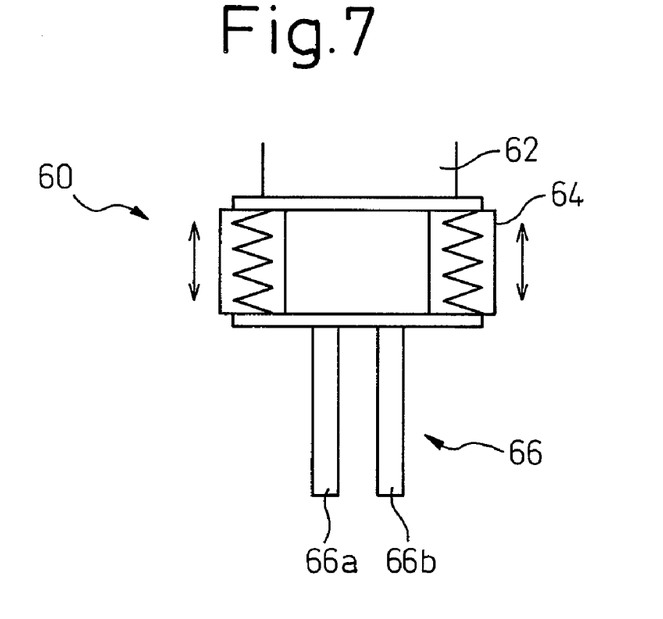
FIG. 7 shows yet another preferred embodiment of the robot hand.

FIGS. 5 to 7 show preferable embodiments of the robot hand applied to the front end of the robot arm of robot 16. A robot hand 40 as shown in FIG. 5 has a front end part 42 having generally a hemispherical or spherical shape and configured to adsorb the selected object by a magnetic force, and an orientation adjusting part or a compliance mechanism 44 adapted to adjust the orientation of front end part 42 relative to the selected object. The shape of front end part 42 may be changed depending on the shape of the object to be picked. In particular, when the object to be picked is a brake disk or the like having a hole or a recess, the hemispherical shape adapted to engage the hole or the recess is suitable. Front end part 42 may have an electromagnet so as to adsorb a metallic object.

Orientation adjusting mechanism 44 in FIG. 5 is a joint mechanism which connects front end part 42 to a base part 46 so that the orientation of front end part 42 may be variable relative to base part 46. Joint mechanism 44 is a rotary joint, for example, by which front end part 42 may incline corresponding to the inclination of the object to be picked so as to properly pick or adsorb the object, when the front end part contacts the object. Joint mechanism 44 is preferably configured to remain or restore front end part 42 at or to the initial orientation (for example, the linear orientation relative to the base part) when an external force is not applied to front end part 42. Such a configuration may be realized by a compliance mechanism having an elastic material such as rubber, as well as the rotary joint. By adjusting the magnetic force of the electromagnet, only one object may be adsorbed to the electromagnet during the picking operation, whereby it is prevented to pick multiple objects simultaneously. Further, the magnetic may be enhanced while the object is conveyed or adsorbed to the electromagnet, so as to prevent the object from dropping. When the object is required to be degaussed, a magnet hand, capable of applying a magnet force for degaussing to the object, may be used. Needless to say, the degauss operation may be carried out in another process.

A robot hand 50 as shown in FIG. 6 has a base part 52, an inflective compliance mechanism, such as a flexible bellows mechanism 54, connected to base part 52, and a front end part 56 connected to bellows mechanism 54 and adapted to adsorb the selected object. Front end part 56 is a suction cup, for example, configured to fit the selected object by a force applied to the cup from the object when the cup has come in contact with the object. Suction cup 56 may generate a vacuum force by means of a vacuum device (not shown) via bellows mechanism 54, in order to adsorb object 14. The robot hand may have multiple suction cups arranged in a line, whereby the stability of adsorption and the stability of orientation of the adsorbed object may be improved. The robot hand having the suction cup is suitable to adsorbingly pick an object having a plane with a certain area. In addition, by selecting a relatively flexible sucker-like member or a sponge-like member in the place of a conventional suction cup, which may fit the shape of the object when the cup adsorbs the object, an object having a curved surface, such as a cylindrical column or a spherical body, may be properly picked.

A robot hand 60 as shown in FIG. 7 has a base part 62, a stretchable mechanism 64 connected to base part 62, and a chuck mechanism 66 attached to the front end of stretchable mechanism 64. Stretchable mechanism 64 may have a bellows or one or more coil springs, for example, as long as the stretchable mechanism has the compliance characteristic. Chuck mechanism 66 has, for example, a pair of claws 66a, 66b, configured to move away from or towards each other, so that the selected object may be gripped between the pair of claws. The robot hand having the chuck mechanism is suitable to grip and pick an object having a portion, which is easily to be gripped, such as a protrusion or a hole. Chuck mechanism 66 is configured to be oriented or inclined so as to properly grip the selected object when the chuck mechanism contacts the selected object. Therefore, even when only one claw of the pair of claws contacts the object to be picked, chuck mechanism 66 may incline corresponding to the orientation of the object by means of stretchable mechanism 64, whereby the success rate of the picking operation is improved. Further, even when the position of the selected object is higher than the estimated position, the robot hand is prevented from excess force being applied due to the stretchable mechanism having a shock-absorbing function.

The above combination of the front end part and the compliance mechanism (for example, the combination of the electromagnet and the rotary joint) is an example, and the other combination may be possible. Further, the above configurations may be combined so as to realize a low-cost and effective picking device.

According to the picking device of the present invention, the object to be picked is selected by using the captured two-dimensional image and the degree of priority thereof, the positional information including the existing height of the object is estimated, and the object is gripped and picked after the contact between the robot hand and the object is detected. Therefore, the picking operation from the random pile may be carried out stably and effectively at high speed. Further, by aligning the path of the approach movement of the robot hand toward the selected object with the view line of the camera, the efficiency of the picking operation is improved.

According to the invention, as a preferable example of the degree of priority, there is provided a product sum value obtained by calculating a summation of at least two of the size information, the degree of coincidence and the degree of inclination of each of the plurality of objects after multiplying a certain coefficient by each of the size information, the degree of coincidence and the degree of inclination, otherwise, a product value of at least two of the size information, the degree of coincidence and the degree of inclination of each of the plurality of objects.

The front end part of the robot hand may be configured to change the orientation thereof corresponding to the orientation of the selected object due to the force applied by the selected object, whereby each object may be properly gripped from the random pile.

The front end part of the robot hand having the hemispherical electromagnet is suitable to adsorb and pick the object having a hole or a recess.

The front end part of the robot hand having the suction cup is suitable to adsorb and pick the object having a plane of a certain area. Further, by selecting the shape of a front end of the suction cup adapted to fit the shape of the object when adsorbing the object, even the object having the shape of a cylinder or a spherical body may be properly picked.

The front end part of the robot hand having the chuck mechanism is suitable to grip and pick the object having a portion, which is easily gripped, such as a hole or a protrusion.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An object picking device, comprising: a camera adapted to capture a two-dimensional image including an image of a plurality of the same kind of objects that are randomly piled; a robot adapted to pick the objects one-by-one from the plurality of objects; an image processing part which processes the image captured by the camera; and a handling controlling part which controls the robot, wherein the image processing part comprises:
a target detecting part which detects information of the two-dimensional position and the size of each objects in the image of the plurality of objects;
a data storing part which stores height information regarding the height of the existing position of an object at a reference position, the height information being associated with size information of the object in the captured image at the reference position, the data storing part also storing data regarding a feature model of the object;
a target selecting part which selects an object as a target to be picked, the object having the highest degree of priority which is calculated by using at least one of size information of an image of each detected object, a degree of coincidence between the image of the detected object and the feature model, and a degree of inclination of the image of the detected object in relation to the feature model;
a view line direction calculating part which calculates the direction of a view line of the camera in the three-dimensional field between the camera and the selected object, based on the information of the two-dimensional position of the selected object;
a target position estimating part which calculates the existing height of the selected object based on the size information of the selected object and the information of the exiting position and the size of the object at the reference position stored in the data storing part, the target position estimating part further calculating the three-dimensional position of the selected object as an intersection point between the view line of the camera and a horizontal plane representing the exiting height of the selected object; and
a grip correction calculating part which calculates an amount of correction of the movement of the robot, the amount of correction being adapted to grip the selected object by using the robot, wherein the handling controlling part comprising:
a movement controlling part which controls the movement of the robot, so as to move a robot hand to the three-dimensional position of the selected object, along the direction of the view line of the camera in relation to the selected object;
a contact sensing part which detects that the robot hand has come in contact with the selected object;

a grip commanding part which commands the robot hand to stop the movement thereof and grip the selected object with the robot hand when the contact sensing part detects the contact between the robot hand and the selected object; and a pull-out commanding part which commands the robot to pull out the object gripped by the robot hand.

2. The object picking device as set forth in claim 1, wherein the degree of priority is a product sum value obtained by calculating a summation of at least two of the size information, the degree of coincidence and the degree of inclination of each of the plurality of objects after multiplying a certain coefficient to each of the size information, the degree of coincidence and the degree of inclination.

3. The object picking device as set forth in claim 1, wherein the degree of priority is a product value of at least two of the size information, the degree of coincidence and the degree of inclination of each of the plurality of objects.

4. The object picking device as set forth in claim 1, wherein the robot hand has a base part, a front end part configured to grip the selected object, and a compliance mechanism which connects the front end part to the base part so that the orientation of the front end part may be varied corresponding to the orientation of the selected object.

5. The object picking device as set forth in claim 4, wherein the front end part has an electromagnet having generally a hemispherical shape adapted to engage a hole or a recess formed in the selected object.

6. The object picking device as set forth in claim 4, wherein the front end part has a suction cup which generates vacuum adsorption force by which the suction cup adsorbingly grips the selected object.

7. The object picking device as set forth in claim 4, wherein the front end part has a chuck mechanism configured to grip the selected object.

* * * * *